United States Patent
Behringer et al.

(10) Patent No.: US 8,688,807 B2
(45) Date of Patent: Apr. 1, 2014

(54) DERIVING UNIQUE LOCAL ADDRESSES FROM DEVICE NAMES

(75) Inventors: Michael H. Behringer, La Colle sur Loup (FR); Steinthor Bjarnason, Fjerdingby (NO); Alvaro Retana, Raleigh, NC (US); Yves Francis Eugene Hertoghs, Schilde (BE)

(73) Assignee: Cisco Technology, Inc., San Jose, CA (US)

( * ) Notice: Subject to any disclaimer, the term of this patent is extended or adjusted under 35 U.S.C. 154(b) by 204 days.

(21) Appl. No.: 13/212,432

(22) Filed: Aug. 18, 2011

(65) Prior Publication Data

US 2013/0046864 A1 Feb. 21, 2013

(51) Int. Cl.
*G06F 15/177* (2006.01)

(52) U.S. Cl.
USPC .................. 709/220; 709/200; 726/3

(58) Field of Classification Search
USPC .................. 709/220, 200, 217; 726/3
See application file for complete search history.

(56) References Cited

U.S. PATENT DOCUMENTS

2006/0020796 A1* 1/2006 Aura et al. .................. 713/168

OTHER PUBLICATIONS

Aura, T., "Cryptographically Generated Addresses (CGA)," *Internet Engineereing Task Force*, http://www.ietf.org/rfc/rfc3972.txt, downloaded Jul. 26, 2011, Mar. 2005.
Hinden, R. et al., "Unique Local IPv6 Unicast Addresses," *Internet Engineering Task Force*, http://tools.ietf.org/html/rfc4193, downloaded Jul. 26, 2011, Oct. 2005.

* cited by examiner

*Primary Examiner* — El Hadji Sall
(74) *Attorney, Agent, or Firm* — Baker Botts L.L.P.

(57) ABSTRACT

In one embodiment, accessing a device name, which includes a hostname and a domain name, of a network device; applying a hash function to the domain name to obtain 40 bits as a Global ID of an Internet Protocol version 6 (IPv6) unique local address (ULA); and encoding the hostname to obtain 80 bits as a Subnet ID and an Interface ID of the IPv6 ULA.

22 Claims, 2 Drawing Sheets

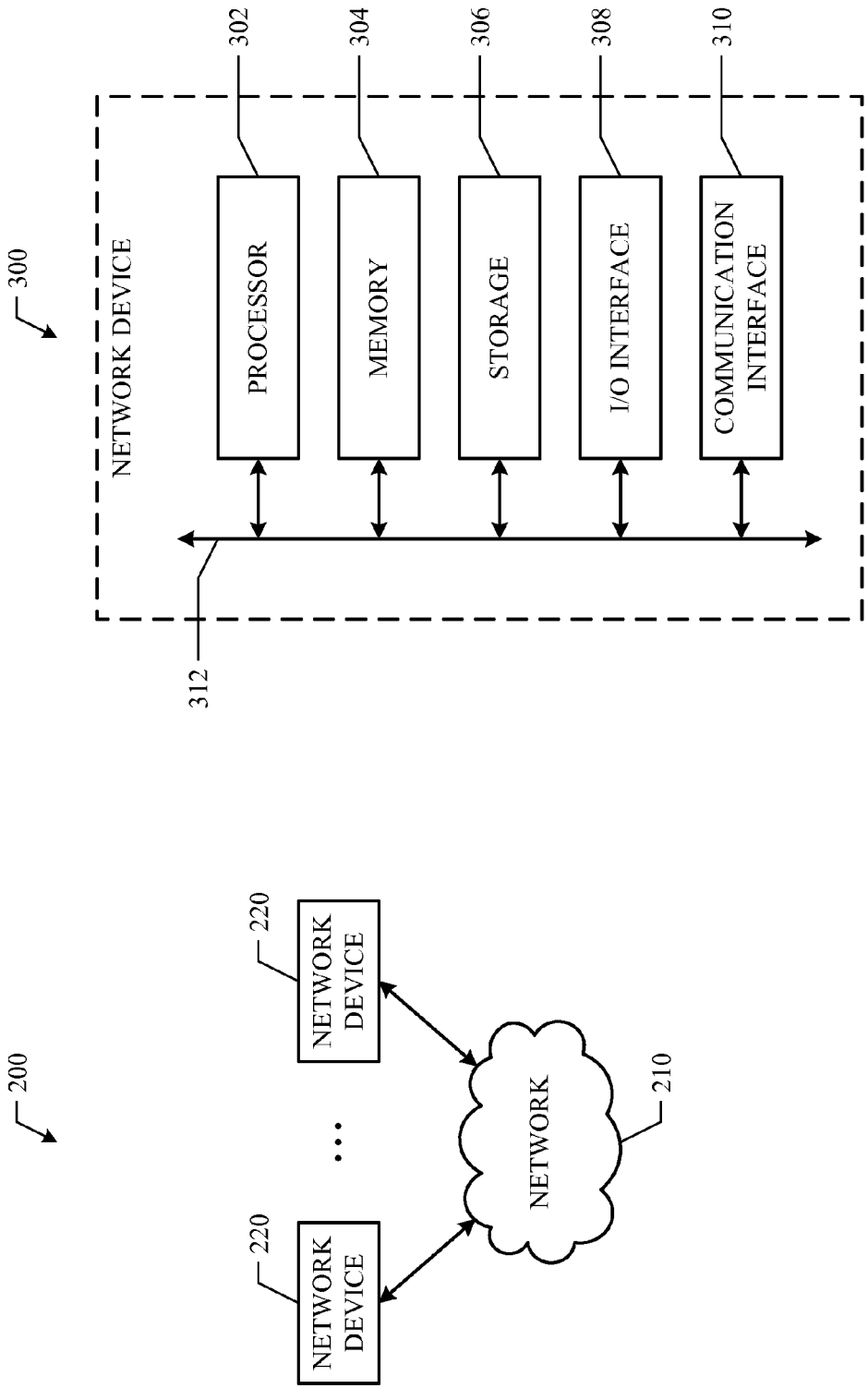

DERIVING UNIQUE LOCAL ADDRESSES FROM DEVICE NAMES

TECHNICAL FIELD

This disclosure generally relates to network devices and more specifically relates to deriving Internet Protocol version 6 (IPv6) unique local addresses (ULA) for network devices from their device names.

BACKGROUND

The Internet operates by transferring data in individual and often small packets that are independently routed across networks as specified by an international communications protocol known as the Internet Protocol. Internet Protocol version 6 (IPv6) succeeds IPv4 partly due to the growth of the Internet, which has resulted in the need for more addresses that can be supported by IPv4. Like IPv4, IPv6 is an Internet Layer protocol for packet-switched internetworking and provides end-to-end datagram transmission across multiple IP networks. While IPv4 uses 32 bits for each IP address and can therefore support $2^{32}$ (4,294,967,296) addresses, IPv6 uses 128 bits for each IP address and can therefore support $2^{128}$ (approximately $3.4 \times 10^{38}$) addresses. This expansion allows for many more devices and users on the Internet as well as extra flexibility in allocating addresses and efficiency for routing traffic. It also eliminates the primary need for network address translation (NAT).

BRIEF DESCRIPTION OF THE DRAWINGS

FIG. 2 illustrates an example network environment.
FIG. 3 illustrates an example computer system.

DESCRIPTION OF EXAMPLE EMBODIMENTS

Figure 1:
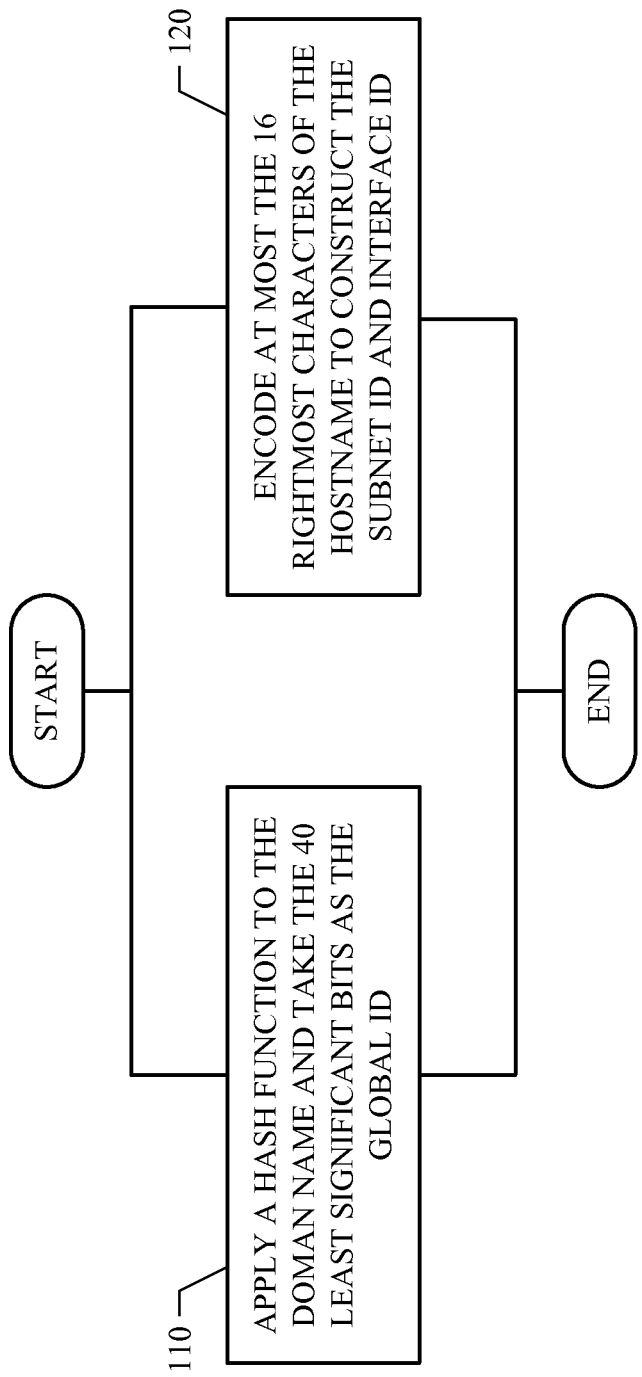
FIG. 1 illustrates an example method for deriving IPv6 ULAs from network device names.

A unique local address (ULA) is an IPv6 address in the block fc00::/7 defined in RFC4193. It is the IPv6 counterpart of the IPv4 private address. Each ULA has 128 bits with the following format:

TABLE 1

| IPv6 ULA Format | | | | |
| --- | --- | --- | --- | --- |
| 7 bits | 1 bit | 40 bits | 16 bits | 64 bits |
| Prefix | L | Global ID | Subnet ID | Interface ID |

Where:
Prefix FC00::/7 prefix to identify local IPv6 unicast addresses;
L Set to 1 if the prefix is locally assigned;
Global ID Identifier used to create a globally unique prefix;
Subset ID Identifier of a subnet within the site;
Interface ID Identifier as defined in IPv6 Addressing Architecture.
ULAs are available for use in private networks (e.g., inside a single site or organization, or spanning a limited number of sites of organizations). RFC4193 defines the format of a ULA but does not prescribe how the full address should be constructed, except that Global IDs are pseudo-random and locally assigned Global IDs must be generated with a pseudo-random algorithm.

Particular embodiments derive a ULA for a network device (e.g., router, gateway, switch, computer, etc.) from its device name. In particular embodiments, a network device may have a device name in the form of "hostname.domain-name". A domain name (e.g., cisco.com, google.com, yahoo.com, microsoft.com, etc.) is an identification label that defines a realm of administrative autonomy, authority, or control on the Internet. Domain names are formed by the rules and procedures of the Domain Name System (DNS). A hostname (e.g., router104, notebook_john, etc.) is a label assigned to a device connected to a computer network and is used to identify the device in various forms of electronic communications. Thus, as an example, the device name of a network device may be "router104.cisco.com", where "router104" is the hostname portion of the device name and "cisco.com" is the domain-name portion of the device name. Particular embodiments may derive the Global-ID portion (40 bits) of the ULA from the domain-name portion of the device name, and the Subnet-ID and Interface-ID portions (16 bits+64 bits=80 bits) of the ULA from the hostname portion of the device name.

FIG. 1 illustrates an example method for deriving IPv6 ULAs from network device names. Suppose that a network device has a device name in the form of "hostname.domain-name" (e.g., router104.cisco.com). Particular embodiments may apply a hash function to the domain-name portion (e.g., cisco.com) of the device name and take the 40 least significant bits as the Global-ID portion of the ULA, as illustrated in STEP 110. Many hash functions may be used, and this disclosure contemplates any suitable hash function. In one implementation, a SHA-1 hash function may be applied to the domain-name portion of the device name. SHA stands for Secure Hash Algorithm. There are three structurally different SHAs, distinguished as SHA-0, SHA-1, and SHA-2. SHA-1 is a cryptographic hash function and produces a 160-bit result. The 40 least significant bits of the result may be used as the Global ID in the ULA. This yields a pseudo-random Global ID, and thus complies with RFC4193.

Note that in some rare cases, when applying a hash function to two different domain names, it is possible that the two domain names result in the same hash value, which means it is possible that two domain names may yield the same Global ID. However, the possibility of such an occurrence is very low. Even if, per chance, two domain names yield the same Global ID, particular embodiments derive Unique Local Addresses, which are identified as starting with FD00:/8. ULAs are relevant only within an Enterprise or network, and should not be transmitted on the global Internet. Thus, even if two Enterprises or networks, having different domain names, end up with the same Global ID, they should never see each other's packets.

Particular embodiments may construct the Subnet-ID and Interface-ID portions (80 bits) of the ULA by encoding the hostname portion of the device name, as illustrated in STEP 120. A hostname may be formed using 26 letters (not case sensitive), 10 digits (0 to 9), and "-" and ".". This results in a total of 38 unique characters to be encoded.

In one implementation, 5 bits are used to encode the 38 characters (e.g., "a" is encoded as "00000", "b" is encoded as "00001", "c" is encoded as "00010", and so on). In this case, some characters may have the same encoding as $2^5=32$ (i.e., the characters are not uniquely encoded). If the hostname has 16 characters or more, only the 16 rightmost characters are used. Each character is encoded to produce 5 bits, and thus 16 characters may be encoded to produce 80 bits. On the other hand, if the hostname has less than 16 characters, the available characters are encoded to produce some number of bits, and a sufficient number of "0" bits is padded to the most significant side to fill in for the missing bits and make the total number of bits 80. For example, to encode hostname "router104", the characters "r", "o", "u", "t", "e", "r", "1", "0", and "4" are each encoded to produce a total of 45 bits, and 35 "0" bits are padded to the left to make the total number of bits 80.

Alternatively, in another implementation, 6 bits are used to encode the 38 characters (e.g., "a" is encoded as "000000", "b" is encoded as "000001", "c" is encoded as "000010", and so on). In this case, the 38 characters can be uniquely encoded. If the hostname has 13 characters or more, only the 13 rightmost characters are used. Each character is encoded to produce 6 bits, and thus 13 characters may be encoded to produce 78 bits. The 2 most significant bits may be padded with 2 "0" bits. On the other hand, if the hostname has less than 13 characters, the available characters are encoded to produce some number of bits. Finally, a sufficient number of "0" bits is padded to the most significant side to fill in for the missing bits and make the total number of bits 80. For example, to encode hostname "router104", the characters "r", "o", "u", "t", "e", "r", "1", "0", and "4" are each encoded to produce a total of 54 bits, and 26 "0" bits are padded to the left to make the total number of bits 80.

Alternatively, in another implementation, again, 6 bits are used to encode the 38 characters). If the hostname has 14 characters or more, only the 14 rightmost characters are used. Each character is encoded to produce 6 bits, and thus 14 characters may be encoded to produce 84 bits. The 4 most significant or least significant bits may be discarded so that the total number of bits remaining is 80. On the other hand, if the hostname has less than 14 characters, the available characters are encoded to produce some number of bits, and a sufficient number of "0" bits is padded to the most significant side to fill in for the missing bits and make the total number of bits 80.

The following illustrates an example encoding scheme for the characters used in hostnames.

| Character | 6-Bit encoding |
|---|---|
| a | 000000 |
| b | 000001 |
| c | 000010 |
| d | 000011 |
| e | 000100 |
| f | 000101 |
| g | 000110 |
| h | 000111 |
| i | 001000 |
| j | 001001 |
| k | 001010 |
| l | 001011 |
| m | 001100 |
| n | 001101 |
| o | 001110 |
| p | 001111 |
| q | 010000 |
| r | 010001 |
| s | 010010 |
| t | 010011 |
| u | 010100 |
| v | 010101 |
| w | 010110 |
| x | 010111 |
| y | 011000 |
| z | 011001 |
| 0 | 011010 |
| 1 | 011011 |
| 2 | 011100 |
| 3 | 011101 |
| 4 | 011110 |
| 5 | 011111 |
| 6 | 100000 |
| 7 | 100001 |
| 8 | 100010 |
| 9 | 100011 |
| 0 | 100100 |
| — | 100101 |
| . | 100110 |

Example Hostname Encoding

The Global ID (40 bits), Subnet ID (16 bits), and Interface ID (64 bits) thus derived are predictable. That is, the same device name always produces the same Global ID, Subnet ID, and Interface ID. The Global ID is sufficiently unique for many applications. In particular embodiments, to ensure that the Subnet ID and Interface ID are sufficiently unique, the hostnames of the devices may be required to have 16 characters to more.

In addition, the ULA has 8 bits for prefix. These 8 bits will always be FD00, representing that the ULA is a Unique Local Address according to RFC4193.

The ULAs derived from the device names are site unique, predictable, compliant with RFC4193, and easy to determine. As long as a device has the hash function and the encoding scheme, it can produce a ULA from a device name, and multiple devices having the same hash function and encoding scheme can produce the same ULA from the same device name. This eliminates the need of having a centralized device to determine ULAs for other network devices. The ULAs have many practical applications. For example, they may be used for router loopback interfaces.

Particular embodiments may be implemented in a network environment. FIG. 2 illustrates an example network environment 200. Network environment 200 includes a network 210 coupling one or more network devices 220 to each other. In particular embodiments, network 210 is an intranet, an extranet, a virtual private network (VPN), a local area network (LAN), a wireless LAN (WLAN), a wide area network (WAN), a metropolitan area network (MAN), a portion of the Internet, or another network 210 or a combination of two or more such networks 210. This disclosure contemplates any suitable network 210.

In particular embodiments, each network device 220 may be a unitary device or may be a distributed device spanning multiple devices. Network devices 220 may be of various types, such as, for example and without limitation, computers (servers and clients), data storages, routers, gateways, and switches. In particular embodiments, each network device 220 may include hardware, software, or embedded logic components or a combination of two or more such components for carrying out the appropriate functionalities implemented or supported by network device 220. In some implementations, each network device 220 has software implementing the method illustrated in FIG. 1, such that giving a device name, each network device 220 is capable for deriving an IPv6 ULA using the device name by applying a predetermined hash function to the domain-name portion of the device name and encoding the hostname portion of the device name based on a predetermined encoding scheme.

Particular embodiments may be implemented on one or more network devices. FIG. 3 illustrates an example network device 300. In particular embodiments, one or more devices 300 perform one or more steps of one or more methods described or illustrated herein. In particular embodiments, one or more devices 300 provide functionality described or illustrated herein. In particular embodiments, software running on one or more devices 300 performs one or more steps of one or more methods described or illustrated herein or provides functionality described or illustrated herein. Particular embodiments include one or more portions of one or more devices 300.

This disclosure contemplates any suitable number of devices 300. This disclosure contemplates device 300 taking any suitable physical form. As example and not by way of limitation, device 300 may be an embedded device, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, device 300 may include one or more devices 300; be unitary or distributed; span multiple locations; span multiple machines; or reside in a cloud, which may include one or more cloud components in one or more networks. Where appropriate, one or more devices 300 may perform without substantial spatial or temporal limitation one or more steps of one or more methods described or illustrated herein. As an example and not by way of limitation, one or more devices 300 may perform in real time or in batch mode one or more steps of one or more methods described or illustrated herein. One or more devices 300 may perform at different times or at different locations one or more steps of one or more methods described or illustrated herein, where appropriate.

In particular embodiments, network device 300 includes a processor 302, memory 304, storage 306, an input/output (I/O) interface 308, a communication interface 310, and a bus 312. Although this disclosure describes and illustrates a particular device having a particular number of particular components in a particular arrangement, this disclosure contemplates any suitable device having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, device 300 may load instructions from storage 306 or another source (such as, for example, another device 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include an HDD, a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to device 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both providing one or more interfaces for communication between device 300 and one or more I/O devices. Device 300 may include one or more of these I/O devices, where appropriate. One or more of these I/O devices may enable communication between a person and device 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between device 300 and one or more other devices 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, device 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, device 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Device 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of device 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 302 (such as, for example, one or more internal registers or caches), one or more portions of memory 304, one or more portions of storage 306, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising: by one or more devices,
   accessing a device name, which includes a hostname and a domain name, of a network device;
   applying a hash function to the domain name to obtain 40 bits as a Global ID of an Internet Protocol version 6 (IPv6) unique local address (ULA); and
   encoding the hostname to obtain 80 bits as a Subnet ID and an Interface ID of the IPv6 ULA.

2. The method of claim 1, wherein the hash function is SHA-1.

3. The method of claim 1, wherein the 40 bits for the Global ID is 40 least significant bits of a hash value resulted from applying the hash function to the domain name.

4. The method of claim 1, wherein encoding the hostname to obtain 80 bits as the Subnet ID and the Interface ID of the IPv6 ULA comprises:
   if the hostname has 16 characters or more, then encoding each of 16 rightmost characters of the hostname using 5 bits to produce 80 bits; and
   if the hostname has less than 16 characters, then:
      encoding each character of the hostname using 5 bits; and
      padding one or more most significant bits as 0 to make a total number of bits 80.

5. The method of claim 1, wherein encoding the hostname to obtain 80 bits as the Subnet ID and the Interface ID of the IPv6 ULA comprises:
   if the hostname has 13 characters or more, then:
      encoding each of 13 rightmost characters of the hostname using 6 bits to produce 78 bits; and
      padding two most significant bits as 0; and
   if the hostname has less than 13 characters, then:
      encoding each character of the hostname using 6 bits; and
      padding one or more most significant bits as 0 to make a total number of bits 80.

6. The method of claim 1, wherein encoding the hostname to obtain 80 bits as the Subnet ID and the Interface ID of the IPv6 ULA comprises:
   if the hostname has 14 characters or more, then:
      encoding each of 14 rightmost characters of the hostname using 6 bits to produce 84 bits; and
      discarding 4 least significant or most significant bits; and
   if the hostname has less than 14 characters, then:
      encoding each character of the hostname using 6 bits; and
      padding one or more most significant bits as 0 to make a total number of bits 80.

7. The method of claim 1, further comprising setting 8 bits of a Prefix of the IPv6 ULA to FD00.

8. A system comprising:
   a memory comprising instructions executable by one or more processors; and
   the one or more processors coupled to the memory and operable to execute the instructions, the one or more processors being operable when executing the instructions to:
      access a device name, which includes a hostname and a domain name, of a network device;
      apply a hash function to the domain name to obtain 40 bits as a Global ID of an Internet Protocol version 6 (IPv6) unique local address (ULA); and
      encode the hostname to obtain 80 bits as a Subnet ID and an Interface ID of the IPv6 ULA.

9. The system of claim 8, wherein the hash function is SHA-1.

10. The system of claim 8, wherein the 40 bits for the Global ID is 40 least significant bits of a hash value resulted from applying the hash function to the domain name.

11. The system of claim 8, wherein encoding the hostname to obtain 80 bits as the Subnet ID and the Interface ID of the IPv6 ULA comprises:
    if the hostname has 16 characters or more, then encode each of 16 rightmost characters of the hostname using 5 bits to produce 80 bits; and
    if the hostname has less than 16 characters, then:
       encode each character of the hostname using 5 bits; and
       pad one or more most significant bits as 0 to make a total number of bits 80.

12. The system of claim 8, wherein encoding the hostname to obtain 80 bits as the Subnet ID and the Interface ID of the IPv6 ULA comprises:
    if the hostname has 13 characters or more, then:
       encode each of 13 rightmost characters of the hostname using 6 bits to produce 78 bits; and
       pad two most significant bits as 0; and
    if the hostname has less than 13 characters, then:
       encode each character of the hostname using 6 bits; and
       pad one or more most significant bits as 0 to make a total number of bits 80.

13. The system of claim 8, wherein encoding the hostname to obtain 80 bits as the Subnet ID and the Interface ID of the IPv6 ULA comprises:
    if the hostname has 14 characters or more, then:
       encode each of 14 rightmost characters of the hostname using 6 bits to produce 84 bits; and
       discard 4 least significant or most significant bits; and
    if the hostname has less than 14 characters, then:
       encode each character of the hostname using 6 bits; and
       pad one or more most significant bits as 0 to make a total number of bits 80.

14. The system of claim 8, wherein the one or more processors are further operable when executing the instructions to set 8 bits of a Prefix of the IPv6 ULA to FD00.

15. One or more computer-readable non-transitory storage media embodying software operable when executed by one or more computer systems to:
    access a device name, which includes a hostname and a domain name, of a network device;
    apply a hash function to the domain name to obtain 40 bits as a Global ID of an Internet Protocol version 6 (IPv6) unique local address (ULA); and
    encode the hostname to obtain 80 bits as a Subnet ID and an Interface ID of the IPv6 ULA.

16. The media of claim 15, wherein the hash function is SHA-1.

17. The media of claim 15, wherein the 40 bits for the Global ID is 40 least significant bits of a hash value resulted from applying the hash function to the domain name.

18. The media of claim 15, wherein encoding the hostname to obtain 80 bits as the Subnet ID and the Interface ID of the IPv6 ULA comprises:
   if the hostname has 16 characters or more, then encode each of 16 rightmost characters of the hostname using 5 bits to produce 80 bits; and
   if the hostname has less than 16 characters, then:
      encode each character of the hostname using 5 bits; and
      pad one or more most significant bits as 0 to make a total number of bits 80.

19. The media of claim 15, wherein encoding the hostname to obtain 80 bits as the Subnet ID and the Interface ID of the IPv6 ULA comprises:
   if the hostname has 13 characters or more, then:
      encode each of 13 rightmost characters of the hostname using 6 bits to produce 78 bits; and
      pad two most significant bits as 0; and
   if the hostname has less than 13 characters, then:
      encode each character of the hostname using 6 bits; and
      pad one or more most significant bits as 0 to make a total number of bits 80.

20. The media of claim 15, wherein encoding the hostname to obtain 80 bits as the Subnet ID and the Interface ID of the IPv6 ULA comprises:
   if the hostname has 14 characters or more, then:
      encode each of 14 rightmost characters of the hostname using 6 bits to produce 84 bits; and
      discard 4 least significant or most significant bits; and
   if the hostname has less than 14 characters, then:
      encode each character of the hostname using 6 bits; and
      pad one or more most significant bits as 0 to make a total number of bits 80.

21. The media of claim 15, wherein the software is further operable when executed by the one or more computer systems to set 8 bits of a Prefix of the IPv6 ULA to FD00.

22. A system comprising:
   means for accessing a device name, which includes a hostname and a domain name, of a network device;
   means for applying a hash function to the domain name to obtain 40 bits as a Global ID of an Internet Protocol version 6 (IPv6) unique local address (ULA); and
   means for encoding the hostname to obtain 80 bits as a Subnet ID and an Interface ID of the IPv6 ULA.

* * * * *